United States Patent
Nien et al.

(10) Patent No.: US 7,418,607 B2
(45) Date of Patent: Aug. 26, 2008

(54) AUTOMATIC POWER CONSERVATION METHOD FOR AN OPTICAL MEDIA DEVICE

(75) Inventors: Ya-Fang Nien, Taipei (TW); Kuo-An Chang, Taipei (TW); Chi-Hsiang Chang, Taipei (TW)

(73) Assignee: ALi Corporation, Taipei (TW)

( * ) Notice: Subject to any disclaimer, the term of this patent is extended or adjusted under 35 U.S.C. 154(b) by 477 days.

(21) Appl. No.: 10/812,972

(22) Filed: Mar. 31, 2004

(65) Prior Publication Data

US 2005/0114720 A1    May 26, 2005

(30) Foreign Application Priority Data

Nov. 21, 2003   (TW) .............................. 92132656 A

(51) Int. Cl.
*G06F 1/32* (2006.01)
(52) U.S. Cl. ...................................................... 713/320
(58) Field of Classification Search .................. 713/320
See application file for complete search history.

(56) References Cited

U.S. PATENT DOCUMENTS

| 4,635,145 A | * | 1/1987 | Horie et al. | 360/78.04 |
| 5,345,347 A | * | 9/1994 | Hopkins et al. | 360/71 |
| 5,799,199 A |   | 8/1998 | Ito et al. | 395/750.06 |

* cited by examiner

*Primary Examiner*—Rehana Perveen
*Assistant Examiner*—Eric Chang
(74) *Attorney, Agent, or Firm*—Troxell Law Office, PLLC

(57) ABSTRACT

The present invention relates to an automatic power conservation method for an optical media device, which is capable of turning off other circuit components that are still in operation using the host interface of the optical media device when the optical media device enters the sleep-mode, and the host interface also being used to respond to an external signal of the optical media device; using the host interface to wake up those circuit components if the external input signal of the optical media device requesting the optical media device to exit the sleep-mode.

12 Claims, 2 Drawing Sheets

AUTOMATIC POWER CONSERVATION METHOD FOR AN OPTICAL MEDIA DEVICE

BACKGROUND OF THE INVENTION

1. Field of the Invention

The present invention relates to an automatic power conservation method for an optical media device, and more particularly, to an automatic power conservation method for an optical media device that is capable of turning off more circuit components while operating in a sleep-mode.

2. Description of the Prior Art

Energy conservation is a common issue that is being discussed in this era which energy is consumed rapidly. Energy conservation is also an important task while designing an optical media such as CD-ROM, CD-R/RW, DVD-ROM, DVD-R, and DVD-Dual, etc. It is most desirable if the unneeded circuit components of an optical media can all be turned off while it enters the sleep-mode, which it is the main object of the present invention.

Typically, an optical media will enter the sleep-mode after idling for a period of time. The motor inside the optical media will be stopped to reduce the noise and the heat, and a portion of the circuit components on the circuit board will be turned off as well. However, when entering the sleep-mode, some of the components on the circuit board are still functioning, which include the host inference (HI) of the integrated circuit (IC), Random Access Memory Arbiter (RAM Arbiter), Micro-Computing Unit (MCU), and Dynamic RAM (DRAM).

Please refer to FIG. 1, which is a block diagram of the circuitry between the PC and the IC of a conventional optical media device. As the optical media device enters the sleep-mode, the PC, or the Host 150 will send some signals to the HI 120 of the IC 100 in the optical media. Based on the signal received by the HI 120 from the Host 150, the MCU 110 of the IC 100 will send the information of the current operating mode of the optical media device to the Host 150 through the HI 120 in response.

The optical media device can leave the sleep-mode by a request from the user through the Host 150, or through the panel of the optical media (which is not shown in the figure). However, the user wakes the optical media device up from the sleep-mode either through the Host 150 or the panel, the control signal needs to be sent from the HI 120 to the MCU 110 so that the MCU 110 can ask the optical media device to leave the sleep-mode. Moreover, while processing these signals, the MCU 110 needs to access the DRAM 140 outside the IC 100 through the RAM Arbiter 130.

Therefore, while the foregoing conventional mechanism for optical media device is in the sleep-mode, the HI 120, the MCU 110, the RAM Arbiter 130, and the DRAM 140 of the optical media device are, instead of in the sleep-mode, still processing. If these circuit components can as well enter the sleep-mode as the optical media entering the same, the power can be conserved.

In view of this, the present invention provides an automatic power conservation method for optical media device to conserve more power by turning off more circuit components when the optical media device enters the sleep-mode.

SUMMARY OF THE INVENTION

The primary object of the present invention is to provide an automatic power conservation method for an optical media device that, when the optical media device enters the sleep-mode, the HI of the optical media device will turn off other circuit components that are still in operation and thereafter the HI is also being used for issuing a response to an external signal received by the optical media device. If the external signal requests the optical media to leave the sleep-mode, the HI will wake up those circuit components that are turned off by the same.

In the preferred embodiment of the present invention, the HI will first turn off the MCU in the IC, and then the other circuit components that are still in operation will be turned off thereafter. That is, the HI will successively turn off the MCU off first, then the RAM Arbiter and the DRAM.

On the contrary, the HI will wake up some of those circuit components before the MCU is being wakened up. In other words, the HI will successively wake up the RAM Arbiter, the DRAM, and finally the MCU.

However, as the optical media device enters the sleep-mode, the HI will respond to external signals received by the optical media device, such as signals transmitted from the host of a PC or the input panel of the optical media device.

The other object of the present invention is to provide an automatic power conservation device for the optical media device that the host interface of the optical media possesses the firmware capable of responding to an external signal.

To sum up, the present invention provides an automatic power conservation method for the optical media device and the receiving method thereof that is capable of conserving more energy by turning off more circuit components when entering the sleep-mode.

DETAILED DESCRIPTION OF THE PREFERRED EMBODIMENT

In order to turn off more circuit components when the optical media device enters the sleep-mode, such as the MCU and the RAM Arbiter inside the IC or the DRAM outside the IC, the present invention utilizes the HI in the IC of the optical media device to respond to the external signal directly when in the sleep-mode, instead of responding by the MCU. Therefore, if the optical media device can operate using this mechanism (AUTOACK) when entering the sleep-mode, the MCU and the related circuit components posterior to the MCU surely can be turned off so that the power conservation can be achieved when the optical media device enters the sleep-mode.

To further describe the objects and features of the present invention, drawings and detailed description of the preferred embodiment are presented.

Figure 1:
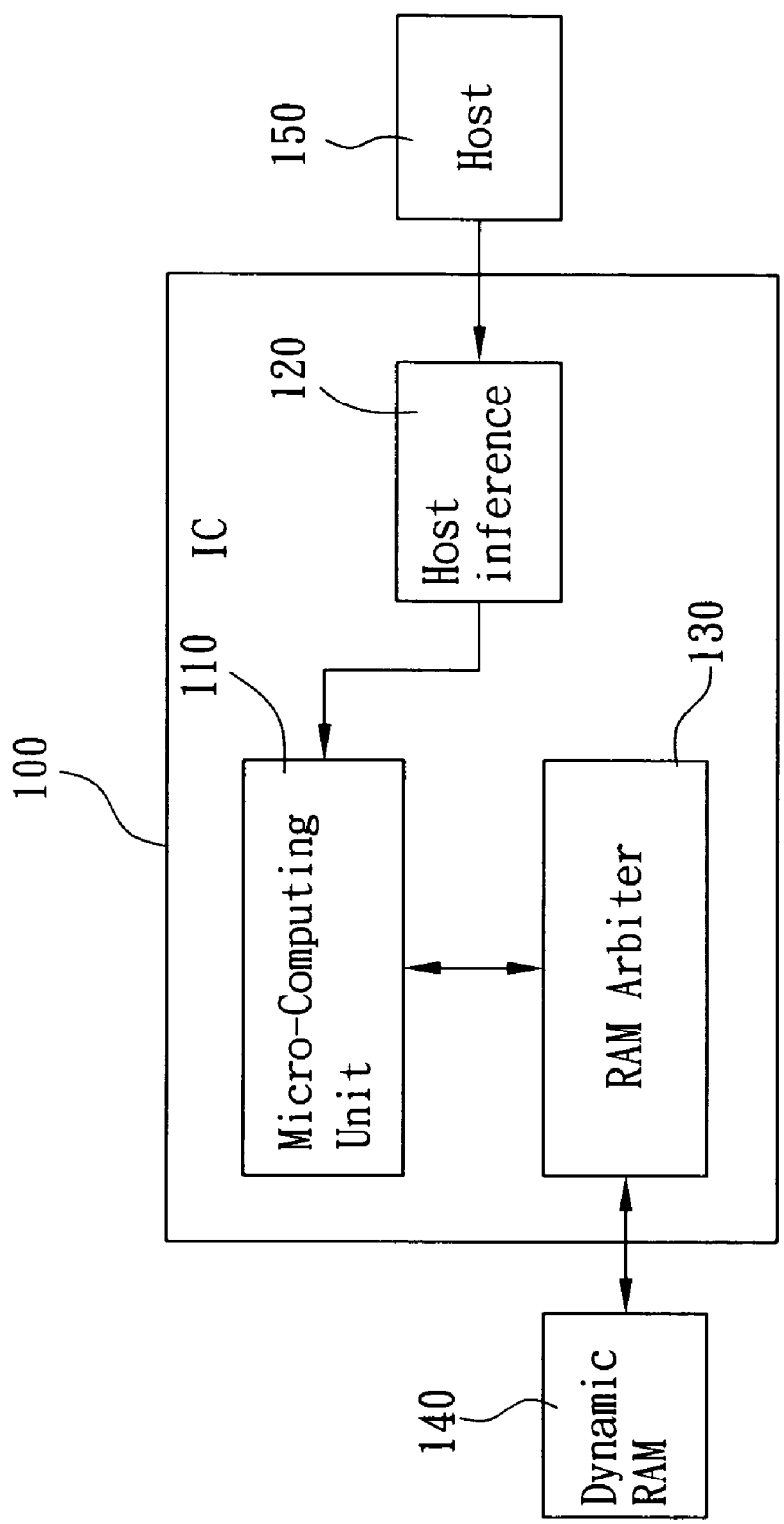
FIG. 1 is a block diagram of the circuitry between the PC and the IC of a conventional optical media.
Figure 2:
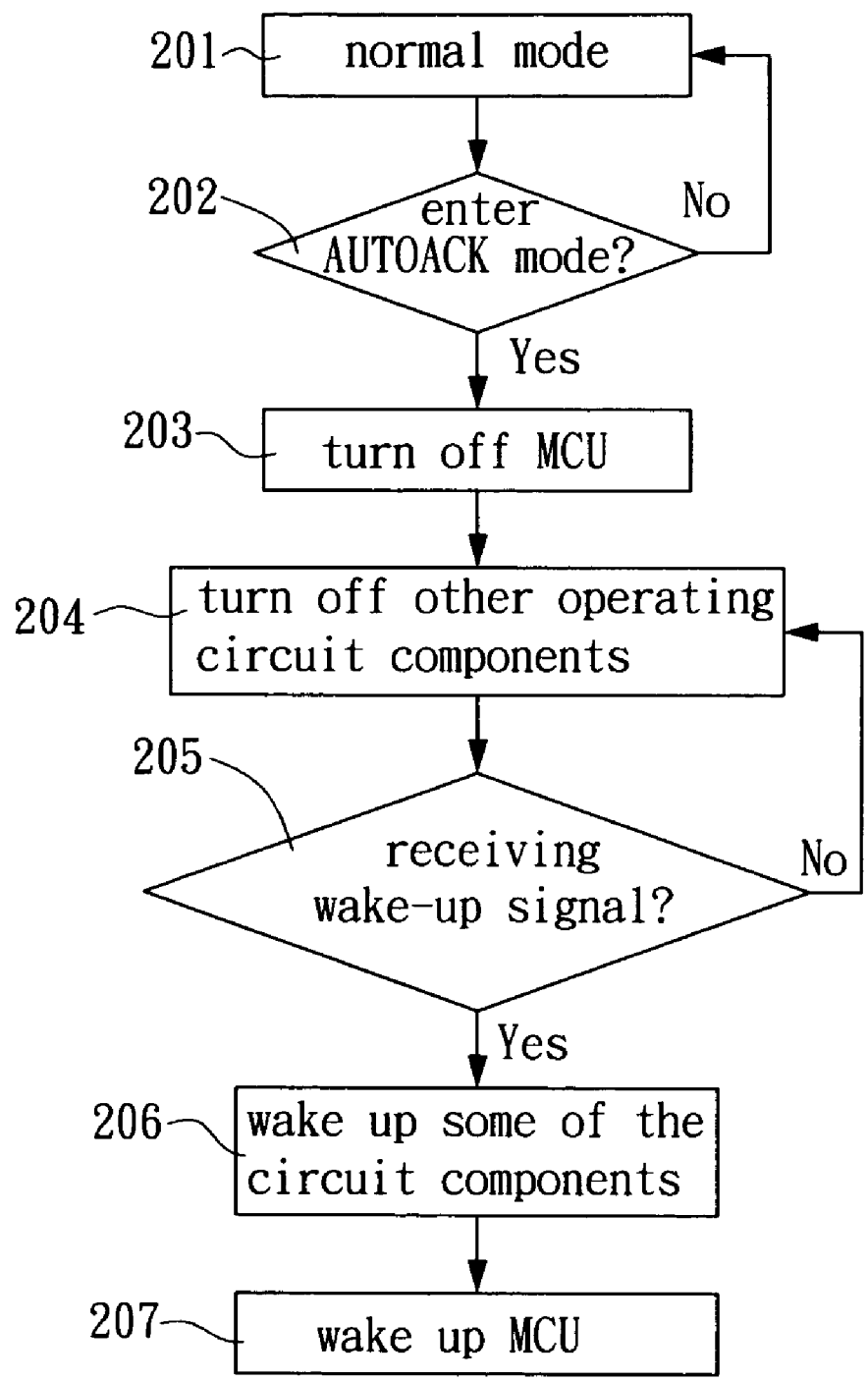
FIG. 2 is a flowchart depicting an automatic power conservation method for optical media according to a preferred embodiment of the present invention.

Please refer to FIG. 2, which is a flowchart depicting an automatic power conservation method for the optical media device according to a preferred embodiment of the present invention. Before entering the sleep mode when the optical media device is on, the optical media device is in a normal mode as seen in Step 201. In step 202, After the optical media device enters the sleep-mode, the HI inside the IC of the optical media device will make an evaluation depending on the idling time of the optical media device to determine whether to execute the power conservation function, or AUTOACK, by the the firmware embedded therein.

As the optical media device had entered the sleep-mode and had idled for a period of time, the HI will execute the AUTOACK and turn off the circuit components that are still in operation, such as the MCU and the RAM Arbiter in the IC, and the DRAM outside the IC. In the preferred embodiment of the present invention, the HI will turn off the MCU first in considering that the MCU consumes most of the power as seen in step 203. In step 204, after turning off the MCU, the HI will then turn off other circuit components that are in operation, such as the RAM Arbiter and the DRAM.

If the optical media device hasn't been idled for a certain period of time after the optical media device enters the sleep-mode, the HI will not execute the AUTOACK function and the optical media device will be in the normal mode, which is represented by steps 202 to 201.

On the contrary, after HI executes the AUTOACK function and turns off the circuit components that are still in operation as the optical media device entered the sleep-mode, the HI plays the role of the MCU in the sleep-mode of a conventional optical media device, that the HI will respond to the external signals sent from the host of the optical media device, or the PC, such as the Test Unit Ready and the Request Sense signals from the PC through the ATAPI interface of the optical media. Assuming the signal sent from the PC to the HI is the Request Sense ATAPI command, the HI will decode the same automatically for determining the transferring mode (PIO/DMA/UDMA) and the amount of data to be transferred, and then transfers a table data to the host so that the host knows the error code of the optical media device, and a interrupt signal is being issued automatically by the HI after the transferring so that the optical media device can still remain in the sleep-mode, which is represented by Steps 205 to 204.

However, if the ATAPI signal from the host is neither the Test Unity Ready nor the Request Sense, or if the play or the eject button on the optical media's panel is being pressed by the user, the HI will first wake up the RAM Arbiter and the DRAM, which is represented by Steps 205 to 206. The HI will then wake up the MCU thereafter, which is represented by Steps 206 to 207.

Therefore, by utilizing the AUTOACK function, the optical media device can turn off the circuit components, such as the MCU, the RAM Arbiter, and the DRAM, that are still in operation in a convention optical media when the optical media device enters the sleep-mode, such that the power consumption can be reduced efficiently. According to the experiments, the power consumption of the optical media device without using the AUTOACK function is 120 mA, while the consumption is significantly reduced to 90~100 mA when the AUTOACK function is on.

In summary, the present invention provides an automatic power conservation method for the optical media device, which is capable of conserving more power by turning off more circuit components when entering the sleep-mode and is realized by the firmware programmed in the HI so that the HI can respond to the host of the optical media device.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An automatic power conservation method for an optical media device, comprising the steps of:
    using a host interface of the optical media device to turn off a plurality of circuit components that are still in operation after the optical media device enters a sleep mode, and when the optical media device is in the sleep mode the host interface being used to respond to an external signal and decoding the external signal utilizing an AUTOACK function; and
    using the host interface of the optical media device to wake up the plurality of circuit components if the external signal requests the optical media device to leave the sleep mode,
    wherein, when the external signal sent from the host is not a Sense command signal, the optical media device waking up and exiting the sleep mode, and
    wherein, when the external signal sent from the host is a Sense command signal, the AUTOACK function is utilized to decode the external signal and the optical media device remaining in the sleep mode.

2. The automatic power conservation method for the optical media device of claim 1, the method further comprising the step of:
    using the host interface of the optical media device to successively turn off a micro-computing unit first, and then the other operating circuit components.

3. The automatic power conservation method for the optical media device of claim 2, the method further comprising the step of:
    using the host interface of the optical media device to successively turn off the micro-computing unit first, a RAM arbitrator, and a DRAM.

4. The automatic power conservation method for the optical media device of claim 3, the method further comprising the step of:
    using the host interface of the optical media device to wake up some of the plurality of circuit components first before the micro-computing unit being wakened up.

5. The automatic power conservation method for the optical media device of claim 4, the method further comprising the step of:
    using the host interface of the optical media device to successively wake up the RAM arbitrator, and finally the micro-computing unit.

6. The automatic power conservation method for the optical media device of claim 1, the method further comprising the step of:
    using the host interface of the optical media device to respond to a signal sent from a host connecting to the optical media device while the optical media device enters the sleep-mode.

7. The automatic power conservation method for the optical media device of claim 6, wherein the host is a personal computer.

8. The automatic power conservation method for the optical media device of claim 7, wherein the external signal is a command signal.

9. The automatic power conservation method for the optical media device of claim 8, wherein the external signal is an ATAPI command signal, and the optical media device wakes up and exits the sleep mode if the ATAPI command signal is a Test Unit command signal or a Request signal.

10. The automatic power conservation method for the optical media device of claim 1, wherein the host interface responds to the external signal inputted through a panel of the optical media device when the optical media device is entering the sleep mode.

11. The automatic power conservation method for the optical media device of claim 10, wherein the signal inputted through the panel includes the signal generated by pressing an external input button of said panel.

12. The automatic power conservation method for the optical media device of claim 11, wherein said external input button is one of the following: a play button and an eject button.

* * * * *